United States Patent [19]

Kazzyk

[11] Patent Number: 5,410,837
[45] Date of Patent: May 2, 1995

[54] ONE WAY ANIMAL PEST TUNNEL

[76] Inventor: Charles Kazzyk, P.O. Box 8045, Saddle Brook, N.J. 07662

[21] Appl. No.: 68,551

[22] Filed: May 27, 1993

[51] Int. Cl.⁶ .......................................... A01M 23/00
[52] U.S. Cl. ............................................ 43/66; 52/101
[58] Field of Search .............. 43/66, 61, 58; 52/101; 160/12

[56] References Cited

U.S. PATENT DOCUMENTS

| | | | |
|---|---|---|---|
| 488,996 | 1/1893 | Fry | 43/66 |
| 891,012 | 6/1908 | Shepard | 43/66 |
| 892,756 | 7/1908 | Morris | 43/66 |
| 904,706 | 11/1908 | Martinson | 43/66 |
| 1,151,041 | 8/1915 | Reefe | 43/66 |
| 1,818,315 | 8/1931 | French | 43/66 |
| 1,911,919 | 5/1933 | Molls | 43/66 |
| 2,787,082 | 4/1957 | Paschen | 43/66 |
| 3,905,922 | 12/1975 | Foltier | 43/66 |
| 4,757,638 | 7/1988 | Lafforthun | 43/66 |

FOREIGN PATENT DOCUMENTS

| | | | |
|---|---|---|---|
| 132957 | 11/1947 | Austria | 43/66 |
| 1178250 | 1/1964 | Germany | 43/66 |

*Primary Examiner*—P. Austin Bradley
*Assistant Examiner*—Jeanne M. Elpel
*Attorney, Agent, or Firm*—Weingram & Zall

[57] ABSTRACT

A method and apparatus for permitting animal pests to exit a structure but preventing such animal pests from returning into the structure is provided. The apparatus includes a cylindrical tunnel having a door within the tunnel biased to extend across the opening of the tunnel in a closed position. Animals may travel in one direction through the tunnel by pushing the door up against its bias. However, the animals are prevented from returning through the tunnel in the opposite direction by the biased tunnel door. The tunnel may be attached to cover a hole in a structure by attaching the tunnel to a cover and attaching the cover to the structure. The tunnel of the present invention may be formed from a wire mesh by a method including forming the wire mesh into a cylindrical shape and attaching a wire mesh door within the wire mesh tunnel.

8 Claims, 3 Drawing Sheets

ONE WAY ANIMAL PEST TUNNEL

BACKGROUND OF THE INVENTION

1. Field of the Invention

This invention relates to an apparatus and method for preventing animal pests from reentering a structure after exiting the structure and more particularly to a one way tunnel which allows an animal pest to leave a structure but prevents the animal pest from reentering the structure.

2. Description of the Prior Art

The conventional method for removing undesired animal pests from a structure includes setting traps to capture the animal pests and then removing the traps containing the animals. The problem with this method is that the traps may kill the animals. Additionally, if the animal pests are located in difficult to reach places in the structure, such traps cannot be set. Accordingly, it is possible to try to "smoke" out the animals with noxious fumes. However, such conventional methods are complicated, uncertain and may result in killing animal pests within the structure.

The prior art includes various examples of animal pest traps as follows:

Fry, U.S. Pat. No. 488,996, discloses an animal trap comprising a cylinder formed by a coil spring with hinged doors at each end. Positioned in the center of the cylinder is bait. The doors incline inward towards the center of the cylinder and are provided at the bottom thereof with a series of points. An animal entering the cylinder will push through the door until it passes the points and will be thereby prevented from backing out of the trap.

Morris, U.S. Pat. No. 892,756, discloses a rat trap comprising a box having side walls and top and bottom walls and a trap door. The door is positioned near one end of the trap and includes a plurality of parallel sharpened prongs connected at their upper ends to a hinge that extends from the top of the trap. The bottom of the box is provided with a hole which permits an animal to enter the trap.

Martinson, U.S. Pat. No. 904,706, discloses a trap having a generally cylindrical body with doors at either end. The doors are hingedly connected and are permitted to move inwardly of the trap, but are prohibited from moving outward by stops. Accordingly, once an animal enters the trap through one end thereof by moving the door out of its way, the animal will not be able to leave because the door will not go past the stop.

Reefe, U.S. Pat. No. 1,151,041, discloses an animal trap comprising a box like structure divided in half by a vertical partition. One end has a hole in the wall to provide an entrance into the trap. Behind the hole is a door that is mounted against the inner surface of the wall and extends inward of the trap against the floor of the trap. The door includes triangular shaped side pieces to completely cover the hole in the wall. The door permits an animal enter the trap but prevents the escape of the animal thereafter.

French, U.S. Pat. No. 1,818,315, discloses a trap comprising a cylindrical body formed of a coil spring. The coil tapers at one end of the trap to close the trap. A pivoted door is provided at the open end of the body. The door includes a plurality of prongs at one end thereof and is pivotally attached at the other end thereof. The door is positioned to extend from the point of pivotal attachment to inward of the cylindrical body. Accordingly, the animal may enter the trap but thereafter will not be able to leave.

Molls, U.S. Pat. No. 1,911,919, discloses a trap comprising four walls which are attachable to form a box. The trap is provided with doors at either end which are pivotally connected to the top sides of the box and extend inwardly therefrom. The doors are adapted to swing inwardly but are prevented from swinging outwardly by means of a stop. Accordingly, an animal may enter the trap by pushing open the door but thereafter cannot leave.

Paschen, U.S. Pat. No. 2,787,082, discloses a trap having a box-like shape with a gate that is pivotally and hingedly mounted at the top of the box and extends inwardly thereof. The trap door is constructed such that it has a wire mesh and portions of it can move with some independence from the other portions so that as an animal enters the trap, the trap door follows the contours of its body and prevents any animals within the trap from exiting the trap.

Foltier, U.S. Pat. No. 3,925,922, discloses a mole trap having a generally cylindrical body with moveable walls at each end. An animal may enter the tubular enclosure by pushing against its wall. After the animal enters the trap, the wall returns to its original position under the action of a spring or by its own weight.

The entire disclosures of these patents are incorporated herein by reference.

None of these patents, taken either alone or in combination, teach or suggest all of the elements of Applicant's present invention nor do they set forth the benefits of Applicant's invention.

OBJECTS AND SUMMARY OF THE INVENTION

It is an object of this invention to provide a one way tunnel for permitting animal pests to exit a structure but not reenter which may be manufactured from inexpensive material.

It is another object of this invention to provide a one way tunnel for permitting animal pests to exit a structure and not return which may be manufactured from a wire mesh.

It is another object of this invention to provide a one way tunnel for permitting animal pests to exit a structure and not return which is simple to construct.

It is an even another object of this invention to provide a one way tunnel for permitting animal pests to exit a structure and not return which may be constructed without the need for complicated tools.

It is still another object of this invention to provide a one way tunnel for permitting animal pests to exit a structure and not return which may be constructed at the site of installation.

It is yet another object of this invention to provide a one way tunnel for permitting animal pests to exit a structure and not return which includes a biased door.

These objects are achieved by the one way tunnel of the present invention which may be manufactured from a wire mesh with the use plier/wire cutter tool. The tunnel includes wire mesh formed into a cylindrical shape. Positioned within the tunnel is a door attached at one end of the tunnel and extending across the tunnel to the end of the tunnel. The tunnel door may also be comprised of a wire mesh. It is positioned within the tunnel and is biased in a closed position, i.e. across the opening of the tunnel. The tunnel is attached to an opening in a structure through which animals pest may enter and exit the structure. As such, when an animal exits the structure it will pass through the tunnel, pushing the tunnel door open and exit the tunnel. However, the animal pest will be unable to return as it will not be able to lift the tunnel door up against its bias to reenter the tunnel and the structure.

BRIEF DESCRIPTION OF THE DRAWINGS

Other important objects and features of the invention will be apparent from the following detailed description of the invention taken in connection with the accompanying drawings in which.

DETAILED DESCRIPTION OF THE INVENTION

Figure 1:
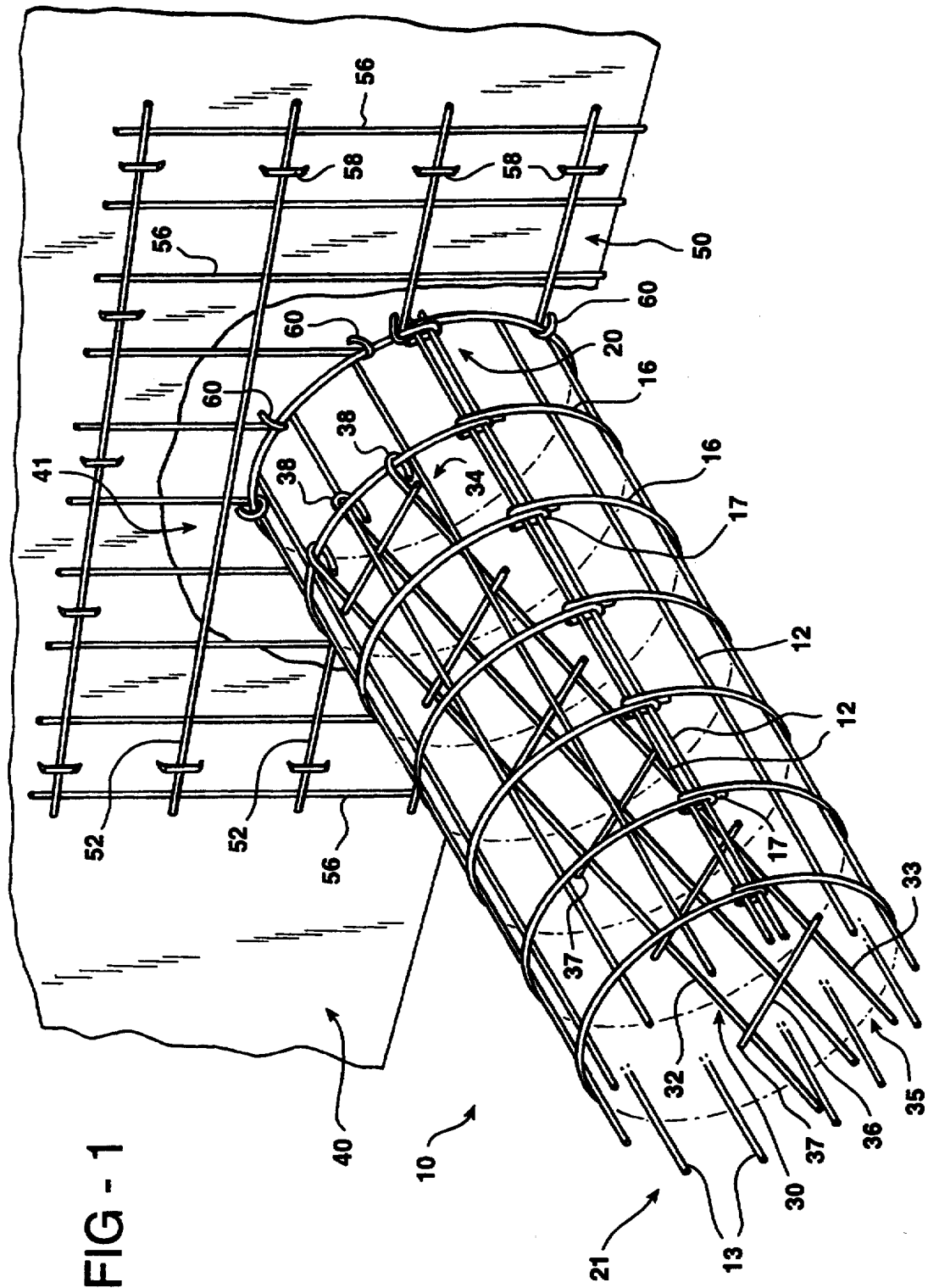
FIG. 1 is a perspective view of the one way tunnel of the present invention attached to a structure.

Referring to FIG. 1, a structure 40 is shown having a hole 41 therein. Without the one way tunnel, animal pests may enter and exit the structure 40 through the hole 41 without restraint. Accordingly, an animal pest may build a home within the structure 40 and exit the structure 40 through the hole 41 to gather food and then return to within the structure 40. Frequently, such holes 41 are found in peripheral areas of structures and/or areas that are difficult to reach from within the structure. Accordingly, it is difficult to remove animal pests from such structures and prevent them from returning therein.

The one way tunnel, as shown in FIG. 1, includes a hole cover, generally indicated as 50, and a one way tunnel, generally indicated at 10. The hole cover 50 is attached to a structure 40 to provide a means for attachment of the tunnel 10 to the structure 40.

As shown in FIG. 1, the hole cover 50 can be formed of any suitable material including a wire mesh having a plurality of longitudinal wire members 52 and a plurality of horizontal wire members 56 forming the wire mesh. The wire mesh is attachable to the structure 40 by any conventional means. As shown in FIG. 1, the hole cover 50 is attached to the structure 40 by means of fasteners 58, which are essentially staples.

In order to permit a passage way through the hole cover 50 an aperture is cut into the hole cover 50 corresponding to the hole 41 in the structure 40. This aperture permits attachment of the tunnel 10 to the hole cover 50.

The tunnel 10 is generally cylindrical. It may be constructed of any conventional material. In one embodiment, as shown in FIG. 1, it is constructed of a wire mesh. As such, the tunnel 10 includes a plurality of longitudinal members 12 extending along the length of the tunnel, 10, and a plurality of circumferential members 16 extending about the circumference of the tunnel. The tunnel 10 constructed of such a wire mesh may include longitudinal member ends 13 extending at one end of the tunnel and circumferential member ends 17 extending from the edges of the seam of the tunnel and used to retain the tunnel in its circumferential shape as hereinafter discussed.

Figure 2:
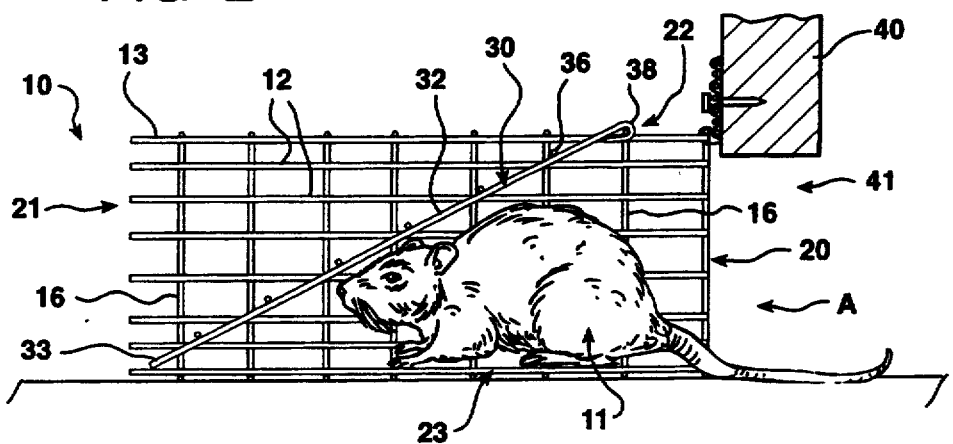
FIG. 2 is a side plan view of FIG. 1 showing an animal pest entering the tunnel.
Figure 3:
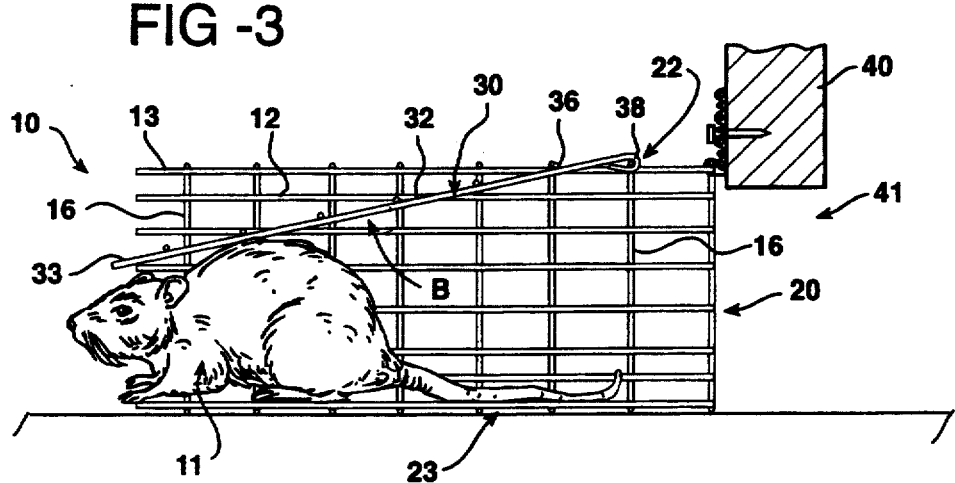
FIG. 3 is a side plan view of the tunnel shown in FIG. 2 with the animal pest exiting the tunnel.
Figure 4:
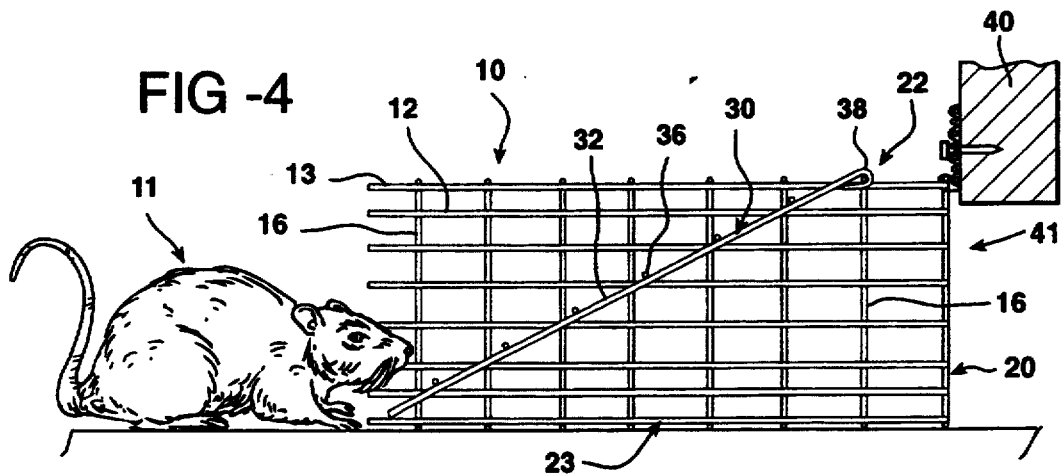
FIG. 4 is a side plan view of the tunnel of FIG. 3 with the animal attempting to reenter a tunnel.

As shown in FIG. 1 and also in FIGS. 2-4, the tunnel of the present invention includes an entrance generally designated as 20, an exit generally designated as 21, a top generally indicated as 22 and a bottom generally indicated as 23. Positioned within the tunnel is a one way door 30. The door may be constructed of any known material, but in the embodiment shown in FIGS. 1-4, it is constructed of a wire mesh including longitudinal members 32 and horizontal members 36. Additionally, the door may include longitudinal member ends 33 and horizontal member ends 37 extending longitudinally and horizontally from the tunnel door.

In the embodiment shown in FIGS. 1-4 the tunnel door 30 is interconnected with the tunnel 10 to extend across the interior of the tunnel from a point at the top 22 of the tunnel near the entrance 20 of the tunnel, across the opening of the tunnel, to a point at the bottom 23 near the tunnel exit 21. The door is interconnected with the tunnel in any convenient way and is preferably biased to extend across the circumferential opening of the tunnel to close the tunnel. As such, the tunnel door may be opened to permit passage of an animal pest through the tunnel by moving the door against its bias, to open the tunnel door to provide a passage through the tunnel.

In a preferred embodiment, the tunnel door is interconnected with the tunnel by means of wrapping longitudinal member ends 33 extending from one end of the tunnel door 30 about one of the circumferential members 16 of the tunnel to interconnect one end of the tunnel door with the top end 22 of the tunnel. Because of the curved nature of the tunnel 30, and the positioning of circumferential members 16, the wrapped longitudinal member ends 33 of the door coact with the circumferential members 16 of the tunnel to bias the door in a closed position. Additionally, the horizontal members 36 of the door 30, particularly the horizontal member ends 37 extending across the door near the point of attachment of the door and the tunnel, coact with the longitudinal members 12 of the tunnel, particularly those extending about the area of attachment of the door to the tunnel, to bias the door in a closed position, It should also be noted that the door may be biased to a closed position by any other means known in the art.

The tunnel 10 is interconnected, as shown in FIG. 1, with the hole cover 15 by turning ends 60, surrounding the aperture formed in the hole cover 50, about the circumferential member 16 at the entrance 20 of the tunnel 10.

As shown in FIGS. 2-3, once the hole cover 50 is attached over the hole 41 and the aperture is formed in the hole cover 50, and tunnel 10 is fastened to the hole cover 50 about the aperture, an animal 11 within the structure desiring to leave the structure will exit the hole 41 in the structure 40 and enter the entrance 20 of the tunnel in the direction of arrow A, FIG. 2. As the animal 11 progresses through the tunnel it will encounter the door 30. As the animal 11 continues to move along the tunnel 10, as shown in FIG. 3, it will push the tunnel door 30 against its bias in the direction of arrow B to move the tunnel door 30 from a first position across the inside of the tunnel to a second, open position to permit the animal to proceed through the tunnel and exit the tunnel through exit 21.

As shown in FIG. 4, after the animal exits the tunnel, it will be prevented from reentering the structure through the tunnel because the tunnel door 30 will be biased to a closed position. As such, the animal 11 will not be able to merely push against the tunnel door to pass through the tunnel but would rather have to open the tunnel door against its bias. The animal 11 will be unable to do so, and will therefore not be able to reenter the structure through the tunnel.

Accordingly, animal pests within a structure will leave the structure through the tunnel and exit the structure and be unable to return into the structure. After a sufficient time period of attachment of a tunnel to the structure, all of the animal pests initially within the structure will have left the structure and will be unable to return. Accordingly, the hole 41 in the structure 40 can then be repaired without the danger of trapping live animals within the structure and without the need for killing animals.

Shown in FIGS. 5-8 is a method for forming the tunnel from a wire mesh material. Although the tunnel may be formed of any material known in the art, FIGS. 5-8 show a preferred embodiment wherein the tunnel can be constructed from inexpensive material using standard tools.

Figure 5:
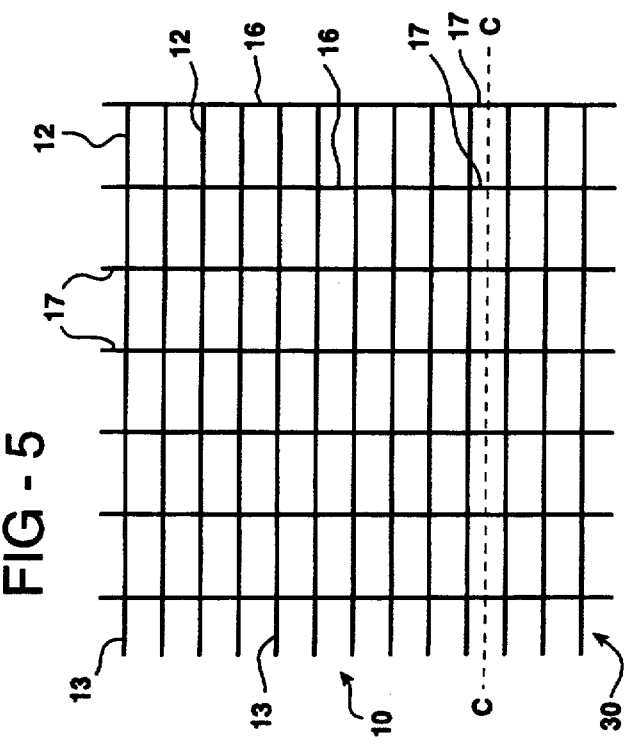
FIG. 5 is a top view of a wire mesh that may be used to construct the one way tunnel of the present invention.

As shown in FIG. 5, a generally square wire mesh comprises longitudinal members 12, longitudinal member ends 13, circumferential members 16, and circumferential member ends 17. The wire mesh is, in a preferred embodiment, 14 gauge galvanized steel wire mesh.

Figure 6:
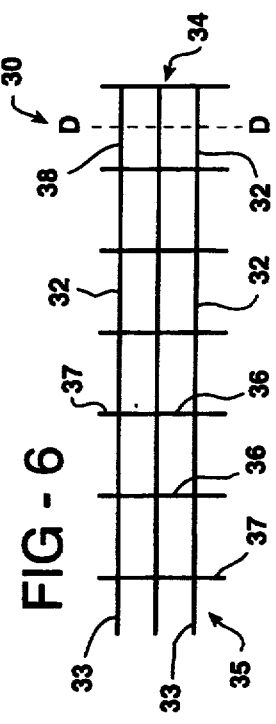
FIG. 6 is a portion of the wire mesh shown in FIG. 5 below dashed line CC.

The first step in constructing the one way tunnel is to cut the wire mesh with wire cutters along the dashed line CC. This divides the wire mesh into components for forming the tunnel 10 and the door 30. Shown in FIG. 6 is the portion of the wire mesh below cut line CC. This portion will become the door 30 of the one way tunnel. The door includes longitudinal members 32, and longitudinal member ends 33, horizontal members 36 and horizontal member ends 37. The door is trimmed along dashed line DD to provide ends 38 for attachment of the door 30 to the tunnel 10.

Figure 7:
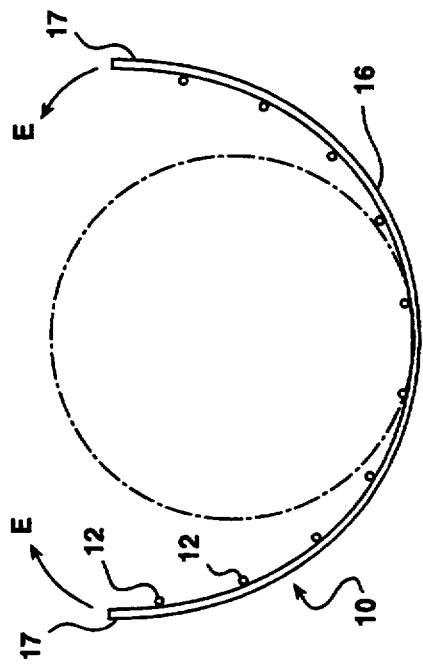
FIG. 7 is a front plan view showing the wire mesh of FIG. 5 being curled into a cylindrical shape to form the one way tunnel of the present invention.

The wire mesh portion shown in FIG. 5 above the cut line CC, generally indicated as 10, is used to form the cylindrical tunnel. As shown in FIG. 7, the tunnel is formed by curling the wire mesh so that the circumferential member ends 17 extending from each side of the wire mesh are moved into close proximity. As shown in FIG. 7 this involves curling the wire mesh along the direction of arrows E. As shown, the circumferential members 16 are thus formed into a generally circular shape.

Figure 8:
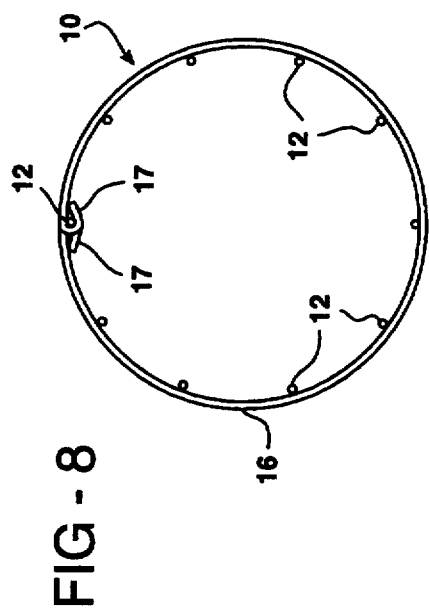
FIG. 8 is a front plan view of the cylindrical one way tunnel of FIG. 7.

As shown in FIG. 8, the tunnel is maintained in a cylindrical shape by turning adjacently positioned circumferential member ends 17 about corresponding longitudinal members 12. Circumferential member ends 17 may be turned about longitudinal members 12, as shown in FIG. 8, by using a plier type tool. Note that FIG. 1 shows the circumferential members ends 17 turned about two adjacently positioned longitudinal members 12.

After forming the cylindrical tunnel 10 as shown in FIG. 8, the tunnel door 30 shown in FIG. 6 must be attached therein. This is accomplished by trimming the end of the tunnel door 30 along line DD to expose ends 38 of tunnel door 30. Next, the tunnel door is inserted into the tunnel, the ends 38 positioned near the entrance 20 of the tunnel 10. Next, the ends 38 are positioned about one of the circumferential members 16. In a preferred embodiment, as shown in FIG. 1, the second circumferential member 16 from the entrance 20 is used as an attachment point for the door 30. To attach the door to the tunnel, the ends 38 are turned about the circumferential member 16. As set forth herein, the curvature of the circumferential member 16 coupled with the ends 38 wrapped thereabout, as well as the coaction between the first horizontal member 36 at the first end 34 of the door 30 and the longitudinal members 12 adjacent to the door 30, causes the door 30 to be biased in a closed position, i.e. across the tunnel with the second end 35 of the door 30 contacting the bottom 23 of the tunnel 10 at the exit 21 of the tunnel 10.

It is important to note, as set forth herein, that Applicant's invention is not limited to use of the preferred materials set forth herein but rather can be accomplished by using any construction materials known in the art. Additionally, any means known in the art may be used for connection of the tunnel to the structure and for connection of the door to the tunnel. Accordingly, the tunnel and the tunnel door, as well as the hole cover, may be formed of a sheet material or any other suitable material.

Modifications of the foregoing may be made without departing from the spirit and scope of the invention. What is desired to be protected by Letters Patents is set forth in the appended claims.

What is claimed is:

1. A method of forming a one way tunnel comprising:
   providing a generally square portion of wire mesh;
   trimming off one edge of the wire mesh to from a door portion of wire mesh and a tunnel portion of wire mesh;
   curling the tunnel portion of wire mesh so that the opposite edges are positioned adjacently to form a cylindrical shape;
   connecting adjacent edges of the tunnel portion of wire mesh to maintain the cylindrical shapes and form a tunnel; and
   connecting the door portion of the wire mesh within the tunnel by interconnecting ends of the door portion about cylindrical wire members of the tunnel.

2. The method of claim 1 further comprising the step of trimming an end of the door portion to expose wire ends for interconnecting the door portion within the tunnel.

3. The method of claim 2 further comprising the step of biasing the door to a closed position.

4. A tunnel for permitting passage of an animal pest through the tunnel in one direction but preventing the return of an animal pest in the opposite direction comprising:
   a cylindrical wire mesh tunnel having longitudinal and circumferential members, the tunnel having a top, a bottom, a first end and a second end, the first and second ends being open;
   tunnel attachment means for attaching the tunnel to a hole a structure, the tunnel attachment means including a hole cover fastened to the structure, an aperture formed in the hole cover and means for attaching the tunnel to the hole cover;

a door attached within and extending across the cylindrical tunnel;

door attachment means for attaching the door within and across the tunnel;

biasing means for biasing the door in a closed position across the tunnel;

wherein an animal pest can enter the first end of the tunnel and proceed through the tunnel, past the tunnel door by pushing the door against its bias to open the door, but the animal pest cannot pass through the tunnel in the opposite direction because it cannot overcome the bias of the door.

5. The apparatus of claim 4 wherein the means for attaching the tunnel to the hole cover comprises turning ends of wires surrounding the aperture of the hole cover about the circumferential member at the entrance of the first end of the tunnel.

6. The apparatus of claim 5 wherein the tunnel door is formed of a wire mesh and comprises longitudinal members and horizontal members.

7. The apparatus of claim 6 wherein the door attachment means comprises wrapping longitudinal member ends extending from the tunnel door about one of the circumferential members of the tunnel.

8. The apparatus of claim 7 wherein the biasing means comprises coacting a horizontal member of the door with a longitudinal member of the tunnel.

* * * * *